US011405381B2

(12) United States Patent
Sathasivam et al.

(10) Patent No.: US 11,405,381 B2
(45) Date of Patent: Aug. 2, 2022

(54) TAG-BASED ACCESS PERMISSIONS FOR CLOUD COMPUTING RESOURCES

(71) Applicant: Hewlett Packard Enterprise Development LP, Houston, TX (US)

(72) Inventors: Pradeep Sathasivam, Karnataka (IN); Sonu Sudhakaran, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 213 days.

(21) Appl. No.: 16/460,527

(22) Filed: Jul. 2, 2019

(65) Prior Publication Data
US 2021/0006551 A1  Jan. 7, 2021

(51) Int. Cl.
*H04L 9/40* (2022.01)

(52) U.S. Cl.
CPC .......... *H04L 63/083* (2013.01); *H04L 63/102* (2013.01)

(58) Field of Classification Search
None
See application file for complete search history.

(56) References Cited

U.S. PATENT DOCUMENTS

| 9,934,269 | B1 | 4/2018 | Kahrs et al. | |
| 10,469,330 | B1* | 11/2019 | Roth | H04L 41/5003 |
| 2014/0207824 | A1 | 7/2014 | Brandwine et al. | |
| 2015/0163158 | A1 | 6/2015 | Ryland | |
| 2016/0283540 | A1* | 9/2016 | Barber | G06F 16/182 |
| 2017/0063946 | A1* | 3/2017 | Quan | H04L 67/20 |
| 2018/0131765 | A1* | 5/2018 | Puleston | G11C 11/00 |
| 2018/0316676 | A1* | 11/2018 | Gilpin | H04L 63/20 |
| 2018/0337915 | A1* | 11/2018 | Tewari | H04L 63/102 |
| 2019/0332683 | A1* | 10/2019 | Thummala | H04L 63/102 |
| 2020/0007531 | A1* | 1/2020 | Koottayi | H04L 63/0815 |
| 2020/0274894 | A1* | 8/2020 | Argoeti | G06F 21/6218 |
| 2020/0285737 | A1* | 9/2020 | Kraus | G06F 21/554 |
| 2021/0250353 | A1* | 8/2021 | Todd | H04L 63/10 |

OTHER PUBLICATIONS

Alessandro Martini, "How to Automatically Tag Amazon EC2 Resources in Response to API Events", available online at <https://aws.amazon.com/blogs/security/how-to-automatically-tag-amazon-ec2-resources-in-response-to-api-events/>. May 16, 2016, 12 pages.

Steve Yedwab, "What Are Access Tags?", available online at <https://clearlogin.zendesk.com/hc/en-us/articles/208259146-What-are-Access-Tags->, Apr. 1, 2016, 3 pages.

Anna Mulamba, "Multi-Cloud Tagging Strategies for the Win", available online at <https://securityboulevard.com/2019/10/multi-cloud-tagging-strategies-for-the-win-2/>, Oct. 14, 2019, 17 pages.

(Continued)

*Primary Examiner* — Davoud A Zand

(74) *Attorney, Agent, or Firm* — Jaffery Watson Mendonsa & Hamilton

(57) ABSTRACT

Example techniques for permitting access to cloud computing resources based on tags are described. In an example, a user is permitted to access a resource provided by a cloud computing platform based on a comparison of identifier of the user with an identifier specified in an access tag associated with the resource.

20 Claims, 7 Drawing Sheets

(56) References Cited

OTHER PUBLICATIONS

Business Wire, "SoftwareONE Enhances PyraCloud Platform to Govern and Maximize the Value of a Multi-Cloud Environment", available online at <https://www.businesswire.com/news/home/20171113005416/en/SoftwareONE-Enhances-PyraCloud-Platform-Govern-Maximize-Multi-Cloud>, Nov. 13, 2017, 2 pages.

Kim Weins, "Better Cloud Management Through Cloud Resource Tagging", available online at <https://www.infoworld.com/article/3246986/better-cloud-management-through-cloud-resource-tagging.html>, Jan. 10, 2018, 6 pages.

PyraCloud, "Manage Tags and Resources", available online at <https://help.pyracloud.com/knowledge-base/managing-tags-and-resources/>, Oct. 4, 2019, 17 pages.

\* cited by examiner

TAG-BASED ACCESS PERMISSIONS FOR CLOUD COMPUTING RESOURCES

BACKGROUND

A cloud computing resource may refer to a resource offered by a cloud computing platform to users. Examples of cloud computing resources are a virtual machine (VM), an application, a database instance, and a storage resource. Access to a cloud computing resource may have to be controlled, for example, to provide data security. For instance, while a first user may have to be permitted to access a VM, a second user may have to be prevented from accessing the VM.

BRIEF DESCRIPTION OF DRAWINGS

The following detailed description references the figures, wherein.

DETAILED DESCRIPTION

Figure 1:
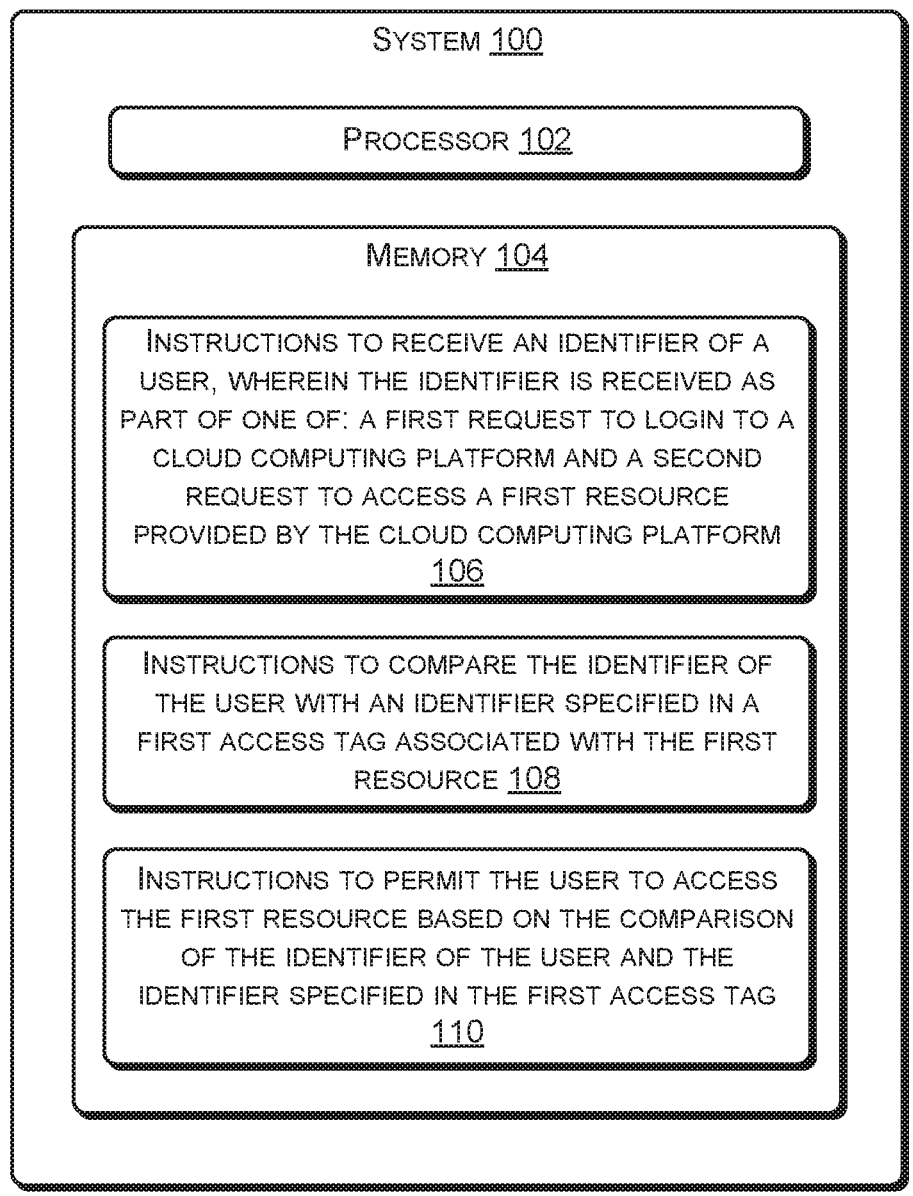
FIG. 1 illustrates a system for controlling permissions to access cloud computing resources based on tags, according to an example implementation of the present subject matter.

Access to cloud computing resources, also referred to as resources, is to be permitted selectively, for security of the cloud computing resources. For instance, an owner of a resource may have to be permitted to access a resource, while other users are to be prevented from accessing the resource. Generally, to permit a user to access a resource, the user is added to a group, such as an administrator group, a developer group, or a tester group, that is permitted to access the resource. Such a process may not be able to ensure security of the resource. For instance, while all users in a group may be permitted to access the resource, in some cases, a subset of the group may have to be selectively permitted to access the resource. Further, the process involves manual creation of several groups, which may be inefficient.

The present subject matter relates to tag-based access permissions for cloud computing resources. With the implementations of the present subject matter, access to cloud computing resources can be efficiently controlled.

In accordance with an example implementation, an access tag may be associated with a resource provided by a cloud computing platform. The access tag may include an identifier corresponding to a user who is permitted to access the resource. Accordingly, in an example, when a user requests permission to access the resource, an identifier of the user is compared with the identifier specified in the access tag. Based on the comparison, the user may be permitted to access the resource. For instance, when the identifier of the user matches with the identifier specified in the access tag, the user may be permitted to access the resource.

In another example, the comparison of the identifier of the user may be initiated upon receiving a login request from the user to login to the cloud computing platform. For instance, upon receiving the login request, the identifier of the user in the login request may be compared with identifiers specified in several access tags, where each access tag corresponds to a resource provided by the cloud computing platform. If the identifier of the user matches with an identifier in an access tag, the user may be permitted to access the corresponding resource. Accordingly, the user may be permitted to access several resources, for which a corresponding access tag specifies the identifier of the user. In an example, to allow a user to access the resources, links to the resources may be provided on a user interface (UI). Thus, once the user logs in to the cloud computing platform, the user may be provided with a UI having several links, each link corresponding to a resource.

In an example, an identifier of a user who is to be permitted to access the resource may be added to the access tag by another user. The other user may be a user who has control over the resource, such as an administrator of the cloud computing platform. In an example, when a user account corresponding to the added identifier is absent in the cloud computing platform, such a user account may be generated.

The usage of access tags of the present subject matter provides an efficient manner of controlling access to cloud computing resources. Hence, addition of users to groups, and the creation and management of groups is eliminated. Further, particular users who are to be permitted to access a cloud computing resource may be specified in the access tag. This allows fine-tuning the access permissions for resources. For instance, two resources of the same type (e.g., VM type) may be made accessible to different sets of users by adding different identifiers in their respective access tags. Since comparison of the identifiers with access tags may be performed upon receiving a login request, the user may be provided with links for all permissible resources (i.e., resources the user is permitted to access) once the user logs in. Therefore, the present subject matter provides an efficient technique for navigating to permissible resources.

Still further, generating a user account based on addition of an identifier to an access tag of a resource and granting permission to the user account to access the resource simplifies and automates the generation of user accounts. As a result, separate processes for generating user accounts and granting access rights to the user accounts may not have to be performed.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for controlling permissions to access cloud computing resources based on tags, according to an example implementation of the present subject matter. The system 100 may be implemented as a computing device, such as a desktop computer, a laptop computer, a server, and the like. In an example, the system 100 may belong to a cloud computing platform. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the memory 104. The computer-readable instructions, hereinafter referred to as instructions, include instructions 106, instructions 108, and instructions 110. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine-readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the system 100 may include instructions 106 to receive an identifier of a user. The identifier may be received as part of a first request to login to a cloud computing platform. Alternatively, the identifier may be received as part of a second request to access a first resource provided by the cloud computing platform.

The system 100 may compare the identifier of the user with an identifier specified in a first access tag associated with the first resource. The system 100 may perform the comparison when the instructions 108 are executed. Based on the comparison of the identifier of the user with the identifier specified in the first access tag, the system 100 may permit the user to access the resource. For instance, when the identifier of the user matches with the identifier specified in the first access tag, the system 100 may permit the user to access the resource. In an example, the system 100 may check if the identifier of the user matches exactly with the identifier in the first access tag. In another example, the system 100 may check for a partial match between the identifier of the user and the identifier specified in the first access tag. For instance, the system 100 may check if a part of the identifier of the user matches with the identifier specified in the first access tag. Example implementations of access tags and granting of access permissions based on comparison of the access tags with identifiers of users will be explained in greater detail below.

Figure 2:
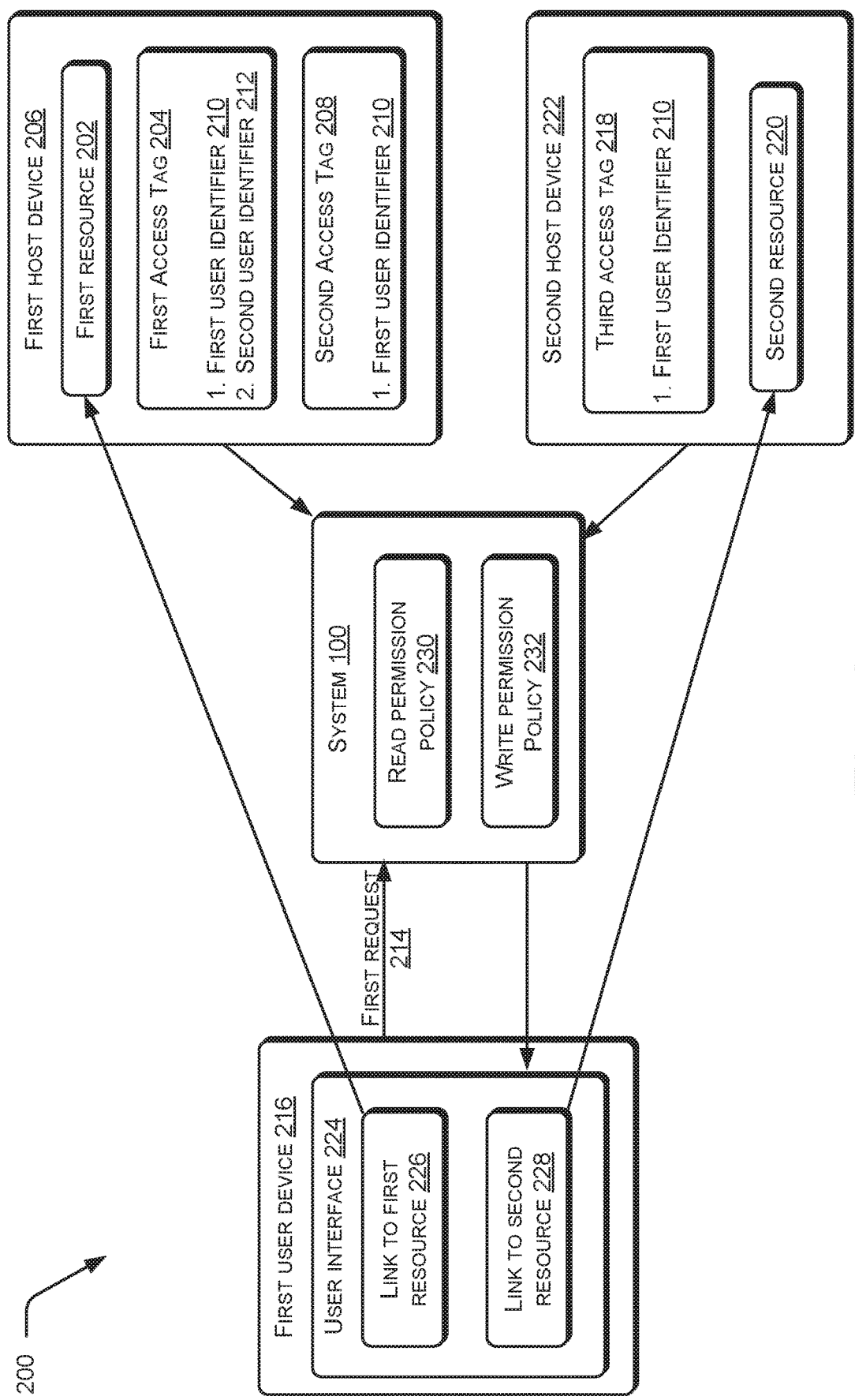
FIG. 2 illustrates a computing environment in which a user is to utilize resources provided by a cloud computing platform, according to an example implementation of the present subject matter.

FIG. 2 illustrates a computing environment 200 in which a user is to utilize resources provided by a cloud computing platform, according to an example implementation of the present subject matter. A cloud computing platform may offer resources for use by users, where the users do not have to actively manage the resources. Examples of a cloud computing platform are Amazon Web Services™ and Microsoft® Azure®. A resource provided by a cloud computing platform may be interchangeably referred to as a cloud computing resource. Examples of cloud computing resources are a virtual machine (VM), an application, a database instance, and a storage resource. The cloud computing resources may be hosted in computing devices of the cloud computing platform. In the description provided below, a cloud computing resource may interchangeably be referred to as a resource.

A resource may have to be made selectively accessible to users to ensure security of the resource. For instance, among all users of the cloud computing platform, a subset of users may have to be permitted to access a resource, while the remaining users are to be denied permission to access the resource. Similarly, among all resources provided by the cloud computing platform, a user may have to be permitted to access a subset of resources. The present subject matter achieves control of access given to users for the resources using tags. Such tags, used for controlling access of the resources, are referred to as access tags.

An access tag may be associated with a resource offered by the cloud computing platform. An example resource offered by the cloud computing platform is a first resource 202. An access tag associated with the first resource 202 may be a first access tag 204. The access tag may be provided as metadata of the resource to which the access tag corresponds. In an example, an access tag may be stored in the computing device in which the corresponding resource is hosted. For instance, the first resource 202 and the first access tag 204 may be present in a first host device 206 of the cloud computing platform. In another example, the access tag may be stored in a centralized access tag repository, which may have access tags associated a plurality of resources. The centralized repository may be, for example, a part of the system 100.

In some cases, a resource may be associated with a plurality of access tags. For instance, the first resource 202 may be associated with a second access tag 208, in addition to the first access tag 204. The plurality of access tags may be used to determine operations permissible for a user on a resource, as will be explained later.

An access tag may include an identifier that may identify one or more users who are permitted to access the resource with which the access tag is associated. For instance, the first access tag 204 may include an identifier 210 identifying a first user and an identifier 212 identifying a second user to indicate that the first user and the second user can be permitted to access the first resource 202. An identifier that identifies a user may be interchangeably referred to as a user identifier. Accordingly, the identifier 210 may be referred to as a first user identifier 210 and the identifier 212 may be referred to as a second user identifier 212. In an example, the first user identifier 210 and the second user identifier 212 may be identifiers of user accounts of the first user and the second user respectively in the cloud computing platform. An access tag may be in a format in which a plurality of identifiers can be specified. For instance, a plurality of identifiers may be separated from each other by a comma in the access tag.

Based on the access tag associated with a resource, the system 100 may determine whether a user is to be permitted to access the resource. For instance, the system 100 may compare the first user identifier 210 with identifiers in the first access tag 204. If the first access tag 204 includes the first user identifier 210 (as illustrated in FIG. 2), the system 100 may determine that the first user may be permitted to access the first resource 202.

In an example, the comparison of the first user identifier 210 with the first access tag 204 may be initiated in response to receiving a request 214 from the first user to login to the cloud computing platform. The request 214 may be interchangeably referred to as a login request 214 or a first request 214. The first user may send the first request 214 using a computing device 216, also referred to as a first user device 216.

In an example, upon receiving the first request 214 from the first user, the system 100 may compare the first user identifier 210 with identifiers specified in a respective access tag of a plurality of resources. For instance, in addition to comparing the first user identifier 210 with identifiers in the first access tag 204, which is associated with the first resource 202, the first user identifier 210 may be compared with identifiers in a third access tag 218, which is associated with a second resource 220 provided by the cloud computing platform. The second resource 220 and the third access tag 218 may be present in a second host device 222. If the third access tag 218 includes the first user identifier 210 (as illustrated in FIG. 2), the system 100 may determine that the first user can access the second resource 220 also. In this manner, upon receiving the first request 214, the system 100 may determine all resources for which the respective access tag specifies the first user identifier 210.

Upon determining the resources for which the respective access tag specifies the first user identifier 210, the system 100 may permit the first user to access such resources. To allow the first user to access a resource, the system 100 may provide a link to the resource on a user interface (UI) 224 provided to the first user. For instance, if the first user is to be permitted to access the first resource 202, a link 226 to the first resource 202 may be provided on the UI 224. Similarly, if the first user is to be permitted to access the second resource 220, a link 228 to the second resource 220 may be provided on the UI 224. Thus, the system 100 may populate the UI 224 with links to all resources that the first user is permitted to access. Thus, once the first user logs into the cloud computing platform, the UI 224 is populated with resources accessible to the first user. The first user may then select a resource from among the accessible resources for performing various operations.

In an example, an access tag may have a respective permission policy. A permission policy may be indicative of an operation permissible on a resource, also referred to as a permissible operation. A permissible operation on a resource may be, for example, a read operation or a write operation. When an access tag is associated with the permission policy, the permissible operation can be performed by the users whose identifiers are specified in the access tag. For instance, the first access tag 204 may be associated with a read permission policy 230, which may indicate a read operation as a permissible operation. Accordingly, the first user and the second user, whose user identifiers are specified in the first access tag 204, may be permitted to perform the read operation on the first resource 202. Similarly, the second access tag 208 may be associated with a write permission policy 232, which may indicate a write operation as a permissible operation. Accordingly, the first user, whose user identifier is specified in the second access tag 208, may be permitted to perform the write operation on the first resource 202. In an example, a set of user identifiers specified in the first access tag 204, which is associated with the read permission policy 230, may be a superset of the set of user identifiers specified in the second access tag 208, which is associated with the write permission policy 232. This is because all users to be permitted to write to a resource are also to be permitted to read the resource. However, not all users who are to be permitted to read the resource are to be permitted to write to the resource. In an example, the permission policies may be stored in the system 100.

The specification of identifiers in access tags and association of access tags with respective permission policies allows permitting different operations to different users. The workflow involved in determining the permissible operations with the help of access tags and permission policies will be explained below with the help of an example scenario.

Upon receiving the first request 214, in an example, the system 100 may select the first access tag 204 for comparison of identifiers, as the first access tag 204 is associated with the read permission policy 230. The system 100 may select the access tag associated with the read permission policy 230 because the read permission policy 230 provides for a basic access, i.e., an access permitting the reading of the first resource 202. Similar to selecting the first access tag 204 for the comparison, the system 100 may select other access tags that correspond to other resources and that are associated with the read permission policy 230 for comparison of identifiers. Upon selecting the first access tag 204, the system 100 may compare the first user identifier 210 with the identifiers specified in the first access tag 204. Further, in response to the first user identifier 210 matching with an identifier specified in the first access tag 204, the system 100 may provide the link 226 on the UI 224, as explained earlier.

Subsequently, when the first user is to access the first resource 202, the first user may select the link 226. Upon receiving a notification from the first user device 216 that the first user has selected the link 226, the system 100 may compare the first user identifier 210 with identifiers specified in the second access tag 208. The system 100 may perform such a comparison to ascertain whether the first user has permission to perform a write operation also on the first resource 202. In response to matching of the first user identifier 210 with an identifier specified in the second access tag 208, the system 100 may permit the first user to perform the write operation on the first resource 202. To allow the first user to perform the write operation, in an example, the system 100 may provide an option to perform the write operation ("a write option") on a UI (not shown in FIG. 2) corresponding to the first resource 202. On the other hand, if the first user identifier 210 does not match with any identifier specified in the second access tag 208, the system 100 may prevent the first user from performing the write operation on the first resource 202. To prevent the first user, the system 100 may mask the write option on the UI. However, since the first user can perform a read operation on the first resource 202, the system 100 may provide a basic access of the first resource 202 to the first user. Thus, the present subject matter allows providing different users with differing levels of access to a resource. Thus, the present subject matter provides a simple and efficient manner of controlling access to resources.

Although, in the above examples, the comparison of identifiers is explained as being initiated in response to a login request, in an example, the comparison of the identifiers may be initiated in response to a specific request to access a resource, as will be explained below.

Figure 3:
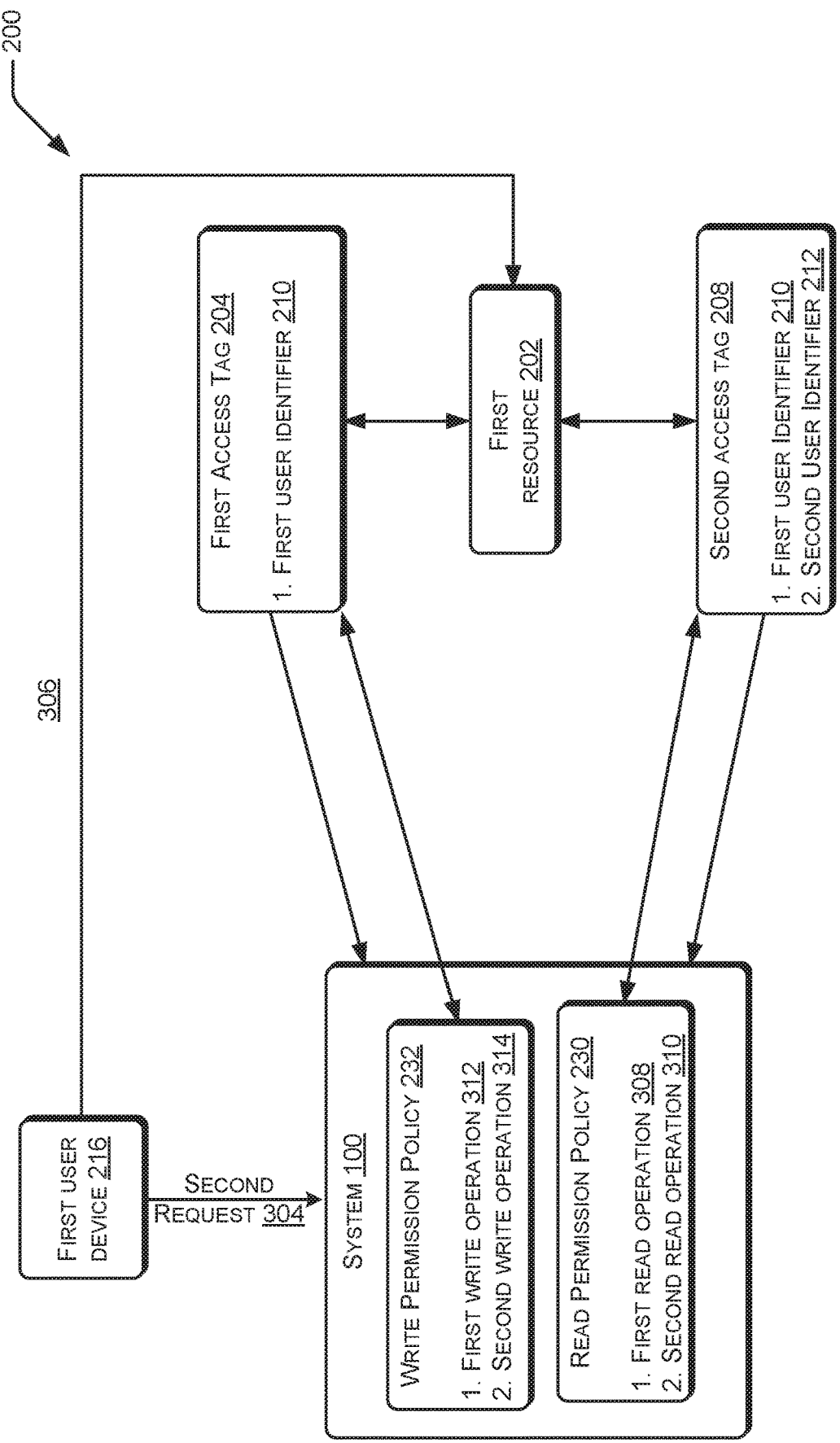
FIG. 3 illustrates a computing environment in which a first user is to access a first resource, according to an example implementation of the present subject matter.

FIG. 3 illustrates the computing environment 200 in which the first user is to access the first resource 202, according to an example implementation of the present subject matter. In an example, upon logging in to the cloud computing platform, links of several resources may be visible to the first user on the UI 224 (not shown in FIG. 3), regardless of whether the first user has access to the resources. The first user may send a request 304 to access the first resource 202, for example, by selecting the link 226 to the first resource 202. The request 304 may be referred to as a second request 304. The second request 304 may be received by the system 100.

Upon receiving the second request 304 to access the first resource 202, the system 100 may determine that the access tag corresponding to the first resource 202 is the first access tag 204, as the first resource 202 is tagged with the first access tag 204. Subsequently, the system 100 may compare the first user identifier 210 present in the second request 304 with each identifier specified in the first access tag 204. If, as illustrated in FIG. 3, the first user identifier 210 is present in the first access tag 204, the system 100 may determine that the first user is permitted to access the first resource 202 and may permit the first user to access the first resource 202. The first user may thus receive permission to access the first resource 202 subject to matching of the identifier of the first user with an identifier specified in the first access tag 204, as indicated by an arrow 306.

To determine permissible operations for a user sending the second request 304, the first resource 202 may be associated with a plurality of access tags and each access tag may be associated with a respective permission policy indicating a permissible operation. The workflow involved in determination of permissible operations when comparison of identifiers is initiated in response to the second request will be explained below with an example.

Consider that the plurality of access tags includes the first access tag 204 and the second access tag 208. Consider also that the first access tag 204 is associated with the write permission policy 232 and the second access tag 208 is associated with the read permission policy 230. In this case, the set of identifiers specified in the first access tag 204 may be a subset of the set of identifiers specified in the second access tag 208. For instance, the first access tag 204 may specify the first user identifier 210, while the second access tag 208 may specify the first user identifier 210 and the second user identifier 212. This is because all users to be permitted to write to a resource are also to be permitted to read the resource, while the converse may not be true.

Upon receiving the second request 304 to access the first resource 202 from the first user, the system 100 may select the first access tag 204 for comparison of the identifiers, as the first access tag 204 is associated with the write permission policy 232. The system 100 may select the access tag associated with the write permission policy 232 to ascertain whether the first user can be permitted to perform the write operation on the first resource 202. If the first user identifier 210 matches with an identifier specified in the first access tag 204, the system 100 may permit the first user to perform the write operation on the first resource 202. For this, the system 100 may provide the write option on the UI corresponding to the first resource 202 provided to the first user, as explained earlier.

Consider, for example, that the first user identifier 210 is absent in the first access tag 204. In such a case, the first user identifier 210 mismatches with the identifiers specified in the first access tag 204. Accordingly, the system 100 may select the second access tag 208 for comparison of the first user identifier 210. The system 100 may select the second access tag 208 to ascertain whether the first user has a basic access of the first resource 202, i.e., the permission to perform read operation on the first resource 202. If the first user identifier 210 is present in the second access tag 208, the system 100 may allow the first user to access the first resource 202 to perform the read operation.

If the first user identifier 210 is absent in the second access tag 208 as well, the system 100 may deny permission to the first user to access the first resource 202. Thus, even though the link 226 is displayed to the first user on the UI 224, the system 100 prevents the first user from accessing the first resource 202, as the first user identifier 210 is not specified in any access tag associated with the first resource 202. Thus, a user can be prevented from accessing a resource that the user is not permitted to access.

Although, in the above examples, the read operation is explained as a single operation, in an example, a plurality of different types of read operations may be performed on the first resource 202. For instance, a parameter reading operation (which involves reading parameters of a resource) and a tag reading operation (which involves reading tags associated with the resource) may be performed on the first resource. The different types of read operations may be collectively referred to as a set of read operations, which may include a first read operation 308 and a second read operation 310. Accordingly, the read permission policy 230 may indicate each read operation of the set of read operations.

Similarly, a set of write operations may be performed on the first resource 202. The set of write operations may include a first write operation 312 and a second write operation 314. The write permission policy 232 may indicate each write operation of the set of write operations. Therefore, in response to matching of identifier of a user with an identifier specified in the first access tag 204 (which is associated with the write permission policy 232), the system 100 may permit the user to perform each write operation specified in the write permission policy, for example, by providing options corresponding to each write operation on the UI corresponding to the first resource 202.

The specifications of the set of read operations in the read permission policy 230 and the set of write operations in the write permission policy 232 is applicable to the examples where the comparison of the identifiers is initiated in response to receiving the first request 214 as well, as discussed earlier with reference to FIG. 2.

Although the above examples have been explained with reference to read operations and write operations, other types of operations may be performable on a resource, such as a delete operation. It is to be understood that the implementations of the present subject matter can be extended to such other types of operations as well.

In an example, the cloud computing platform may offer resources of various resource types for use by the users. Examples of such resource types are a VM type, an application type, a database instance type, and a cloud storage resource type. Further, some read operations applicable for one resource type may not be applicable for another resource type. For instance, while a read operation involving reading of endpoint may be possible for a resource of the application type, such a read operation may not be possible for a resource of storage resource type. Similarly, some write operations applicable for one resource type may not be applicable for another resource type. In such a case, the system 100 may include permission policies specific to resource types. A permission policy corresponding to a resource type may specify operations applicable for that resource type. For instance, the read permission policy 230 and the write permission policy 232 may specify read operations and write operations applicable to a first resource type. Similarly, another read permission policy and another write permission policy (not shown in FIG. 3) may correspond to a second resource type and may specify read operations and write operations applicable to a second resource type. The provision of permission policies for various resource types allows utilization of the present subject matter by a cloud computing platform offering resources of various types.

The association of access tags with resources and addition of identifiers to the access tags will be explained below.

Figure 4:
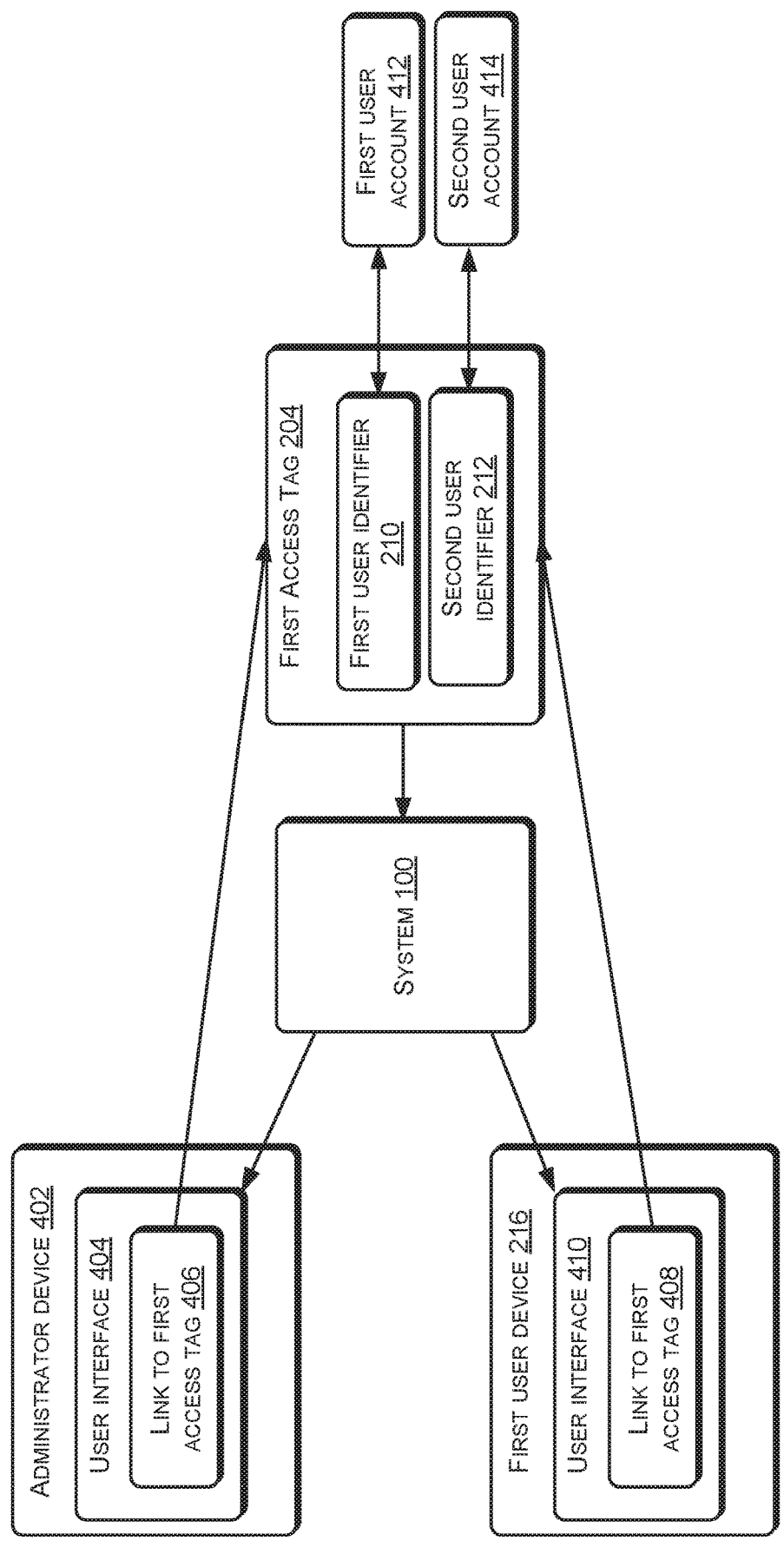
FIG. 4 illustrates addition of identifiers to a first access tag and a second access tag, according to an example implementation of the present subject matter.

FIG. 4 illustrates addition of identifiers to the first access tag 204 and the second access tag 208, according to an example implementation of the present subject matter.

In an example, access tags may be generated from tag templates. Each tag template may be associated with a permission policy. An access tag generated from a tag template can be associated with a resource. Further, user identifiers of users who are to be permitted to access the resource may be added to the generated access tag. Thus, users whose identifiers are added to the access tag can perform operations specified in the associated permission policy on the resource. In an example, the generation of an access tag from a tag template and association of the access tag to a resource may be performed in response to an instruction from a user who has overall control over the resource. Such a user may be, for example, an administrator of the resource. The administrator may provide the instruction using a computing device, also referred to as an administrator device 402. Further, the addition of user identifiers to the access tags may be performed by the system 100 in response to receiving the identifiers from the administrator. Alternatively, the administrator may directly add the identifiers to the access tags. For adding the identifiers, the administrator may utilize a UI 404 provided on the administrator device 402. The UI 404 may include a link 406 to the first access tag 204.

The association of access tags may be performed, in an example, without using tag templates. In such a case, to allow association of access tags with resources, resources may be provisioned along with one or more access tags. Each access tag so provided may also be associated with a permission policy. Although the access tags may be pre-provided, the access tags may not have any user identifiers mentioned by default. The user identifiers may be added to the access tags depending on the operations to be permitted for various users of the cloud computing platform. For instance, initially, the first access tag 204 may be empty. Subsequently, the first access tag 204 may be updated with the first user identifier 210 if the first user is to be permitted to access the first resource 202 (not shown in FIG. 4). In an example, user identifiers may be added to an access tag associated with a resource by a user who has overall control over the resource, such as the administrator of the resource. Alternatively, the addition of user identifiers to the access tags may be performed by the system 100 in response to receiving the identifiers from the administrator.

The addition of user identifiers to access tags may also be controlled, i.e., reserved for particular users. In an example, a user may be permitted to edit an access tag if the identifier of the user is specified in an access tag associated with the write permission policy. For instance, referring to the example implementation of FIG. 3, since the first user identifier 210 is specified in the first access tag 204, which is associated with the write permission policy 232, the first user may be permitted to edit the first access tag 204 and the second access tag 208. Thus, the editing of the access tags may be performed in a manner that would ensure security of the resource. Further, allowing editing of access tags may also simplify sharing of a resource among users. For instance, consider that the second user does not have permission to access the first resource 202. In such a case, if the first resource 202 is to be shared with the second user, the second user identifier 212 may be added to the first access tag 204.

In an example, the second user identifier 212 may be added by a non-administrator user, such as the first user, if the system 100 determines that the non-administrator user has permission to edit the first access tag 204. For instance, upon receiving a request, also referred to as a third request, from the first user to access the first access tag 204, the system 100 may determine whether the first user has permission to edit the first access tag 204. The first user may send the third request by selecting a link 408 to the first access tag 204 provided on a UI 410. The system 100 may perform the determination based on the presence of the first user identifier in the access tag associated with the write permission policy 232, as explained earlier. If the system 100 determines that the first user has permission to edit first access tag 204, the system 100 may permit the first user to access an editable version of the first access tag 204. Accordingly, the first user can add the second user identifier 212 to the first access tag 204.

In an example, the system 100 may keep track of edits to access tags by employing a service (not shown in FIG. 2). Accordingly, upon addition of a user identifier to an access tag, the system 100 gets notified of the user identifier.

A user identifier of a user may be an identifier of a user account of the user in the cloud computing platform. For instance, the first user identifier 210 may be an identifier of a first user account 412 of the first user and the second user identifier 212 may be an identifier of a second user account 414 of the second user. In an example, upon addition of an identifier in an access tag, the system 100 may link the identifier with its corresponding user account. For instance, when the first user identifier 210 is added to the first access tag 204, the system 100 may compare the first user identifier 210 with identifiers of user accounts present in the cloud computing platform and may link the first user identifier 210 with the first user account 412, for which the user identifier is the first user identifier 210.

However, if the system 100 receives a user identifier that does not match with the user identifier of any of the user accounts in the cloud computing platform, the system 100 may deduce that a new user account is to be created with the received user identifier. For instance, upon receiving a notification that the first user identifier 210 is added to the first access tag 204, for example, from the administrator device 402, the system 100 may determine if a user account corresponding to the first user is present in the cloud computing platform. For instance, the system 100 determines whether an existing user account in the cloud computing platform has the first user identifier 210. If the system 100 determines that a user account corresponding to the first user is absent in the cloud computing platform, the system 100 may generate the first user account 412. The identifier of the first user account 412 may be the first user identifier 210.

The creation of user accounts automatically based on addition of user identifiers in access tags facilitates creation of user accounts for users who are meant to access a resource. Thus, the present subject matter facilitates just-in-time creation of user accounts.

Although in the various examples above, the identifiers added to an access tag are explained as identifiers of individual users, in an example, instead of identifiers of individual users, an identifier that identifies a plurality of users may be added to the access tag. Such an identifier may be, for example, a domain identifier of an organization having a plurality of employees. The domain identifier may be, for example, "*@<name of organization>.com", where * indicates that any user whose user identifier ends with "@<name of organization>.com" can access the resource. An identifier may also be, for example, an Internet Protocol (IP) address or a range of IP addresses. Such an identifier can be used, for example, to permit a user operating from a Local Area Network (LAN) of an organization to access the resource.

In the cases where the identifier specified in an access tag may identify a plurality of users, the system 100 may not check for an exact match between the user identifier and the identifier specified in the access tag. For instance, if the identifier specified in the access tag is *@<name of organization>.com and if the user identifier is <user name>@<name of organization>.com, the system 100 may compare a part (i.e., @<name of organization>.com) of the user identifier with a part or whole of the identifier specified in the access tag. Thus, in such cases, the system 100 may check for a partial match between the user identifier and the identifier specified in the access tag. Accordingly, the comparison between the identifier of the user and the identifier specified in the access tag may include: (i) in some cases, determination as to whether the user identifier exactly matches with the identifier in the access tag, and (ii) in some other cases, determination as to whether a particular part of the user identifier matches with a part or the whole of the identifier in the access tag.

Figure 5:
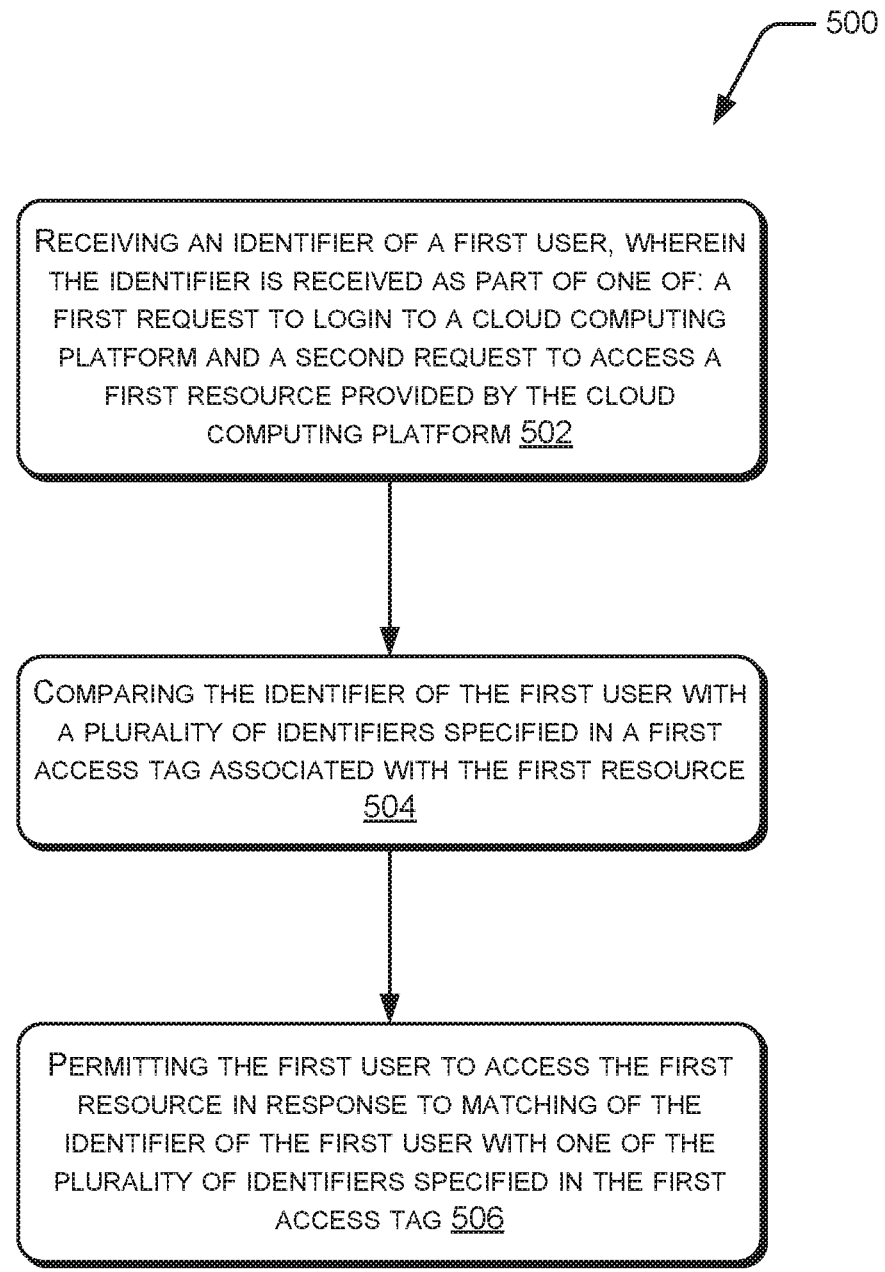
FIG. 5 illustrates a method for controlling permissions to access cloud computing resources based on tags, according to an example implementation of the present subject matter.
Figure 6:
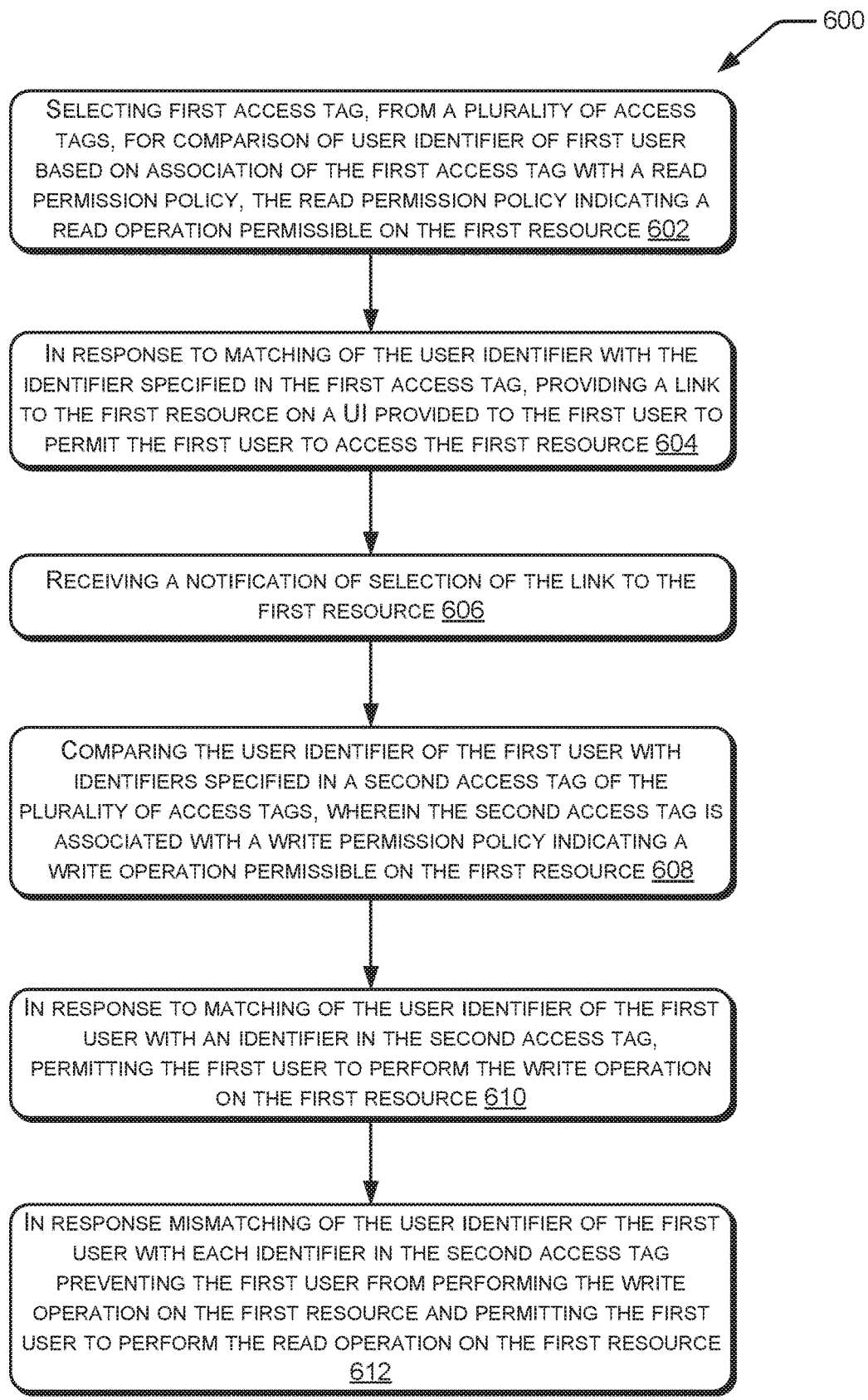
FIG. 6 illustrates a method for controlling operations performable on a first resource by a first user, according to an example implementation of the present subject matter.

FIGS. 5 and 6 illustrate methods 500 and 600 respectively for controlling permissions to access cloud computing resources based on tags, according to example implementations of the present subject matter.

The order in which the methods 500 and 600 is described is not intended to be construed as a limitation, and any number of the described method blocks may be combined in any order to implement the methods 500 and 600, or alternative methods. Furthermore, the methods 500 and 600 may be implemented by processing resource(s) or computing device(s) through any suitable hardware, non-transitory machine-readable instructions, or a combination thereof.

It may be understood that steps of the methods 500 and 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the method 400 may be implemented in a variety of systems, the methods 500 and 600 is described in relation to the system 100, for ease of explanation. In an example, the methods 500 and 600 may be performed by a processing resource, such as the processor 102.

Referring to method 500, at block 502, an identifier of a first user is received. The identifier may be received as part of a first request to login to a cloud computing platform or as part of a second request to access a first resource provided by the cloud computing platform. The first request may be the first request 214 and the second request may be the second request 304. The first resource may be the first resource 202. The first resource may be of a VM type, a cloud storage resource type, an application type, or a database instance type.

At block 504, the identifier of the first user may be compared with a plurality of identifiers specified in a first access tag associated with the first resource. The first access tag may be the first access tag 204. Each identifier in the first access tag may correspond to a user permitted to access the first cloud computing resource. For instance, the first access tag may include a first tag identifier corresponding to the first user and a second tag identifier corresponding to a second user to indicate that the first user and the second user are permitted to access the first cloud computing resource.

At block 506, the first user may be permitted to access the first resource in response to the identifier of the first user matching with one of the plurality of identifiers specified in the first access tag. For instance, if the first access tag includes the first user identifier, the first user identifier in the received request, i.e., the first request or the second request, matches the first user identifier in the first access tag. Accordingly, the first user may be permitted to access the first resource.

In an example, the first resource may be associated with a plurality of access tags, where each access tag is associated with a respective permission policy indicating a permissible operation on the first resource. In response to receiving the second request, the method 500 may include selecting the first access tag, from the plurality of access tags, for comparison with the identifier of the first user. The first access tag may be selected based on association of the first access tag with a write permission policy, such as the write permission policy 232, which indicates a write operation permissible on the first resource. Further, the first user may be permitted to access the first resource to perform the write operation on the first resource if the identifier of the first user matches with an identifier specified in the first access tag. If the identifier of the first user mismatches with identifiers specified in the first access tag, a second access tag may be selected from the plurality of access tags for the comparison with the identifier of the first user. The second access tag may be the second access tag 208 and may be selected based on its association with a read permission policy indicating a read operation permissible on the first resource. If the identifier of the first user matches with an identifier specified in the second access tag, the first user may be permitted to access the first resource to perform the read operation.

In an example, in response to receiving the first request, the method 500 may include comparing the identifier of the first user with identifiers specified in a respective access tag of a plurality of resources provided by the cloud computing platform. The plurality of resources may include the first resource and a second resource, such as the second resource 220. Further, the first user may be permitted to access resources for which the respective access tag specifies the user identifier of the first user, as explained with reference to FIG. 2. The determination of permissible operations for the first user on the first user, if the comparison of identifiers is initiated in response to the first request, will be explained with reference to FIG. 6.

In an example, the method 500 may include receiving a third request from the first user to access the first access tag. The first user may be permitted to access an editable version of the first access tag if it is determined that the first user has permission to edit access tag. Subsequently, the first user may add identifier of a second user to the first access tag, to share the first resource with the second user, as explained with reference to FIG. 4.

FIG. 6 illustrates a method 600 for controlling operations performable on the first resource by the first user, according to an example implementation of the present subject matter.

The method 600 may be carried out when the comparison of identifiers is initiated in response to the first request. The first resource may be associated with a plurality of access tags, where each access tag is associated with a respective permission policy indicating a permissible operation on the first resource.

In response to receiving the first request, at block 602, the first access tag may be selected for comparison of the user identifier of the first user. The first access tag may be selected based on association of the first access tag with the read permission policy, such as the read permission policy 230.

At block 604, a link to the first resource may be provided on a UI provided to the first user if the user identifier of the first user matches with the identifier specified in the first access tag. The link may be the link 226 and may allow the first user to access the first resource.

At block 606, a notification of selection of the link to the first resource is received. In response to the notification, at block 608, the user identifier of the first user is compared with identifiers specified in the second access tag of the plurality of access tags. The second access tag may be associated with the write permission policy, which indicates a write operation permissible on the first resource.

At block 610, the first user may be permitted to perform the write operation on the first resource if the user identifier of the first user matches with an identifier in the second access tag. If the user identifier of the first user mismatches with each identifier in the second access tag, at block 612, the first user may be prevented from performing the write operation on the first resource. However, the first user may be permitted to perform the read operation on the first resource.

Figure 7:
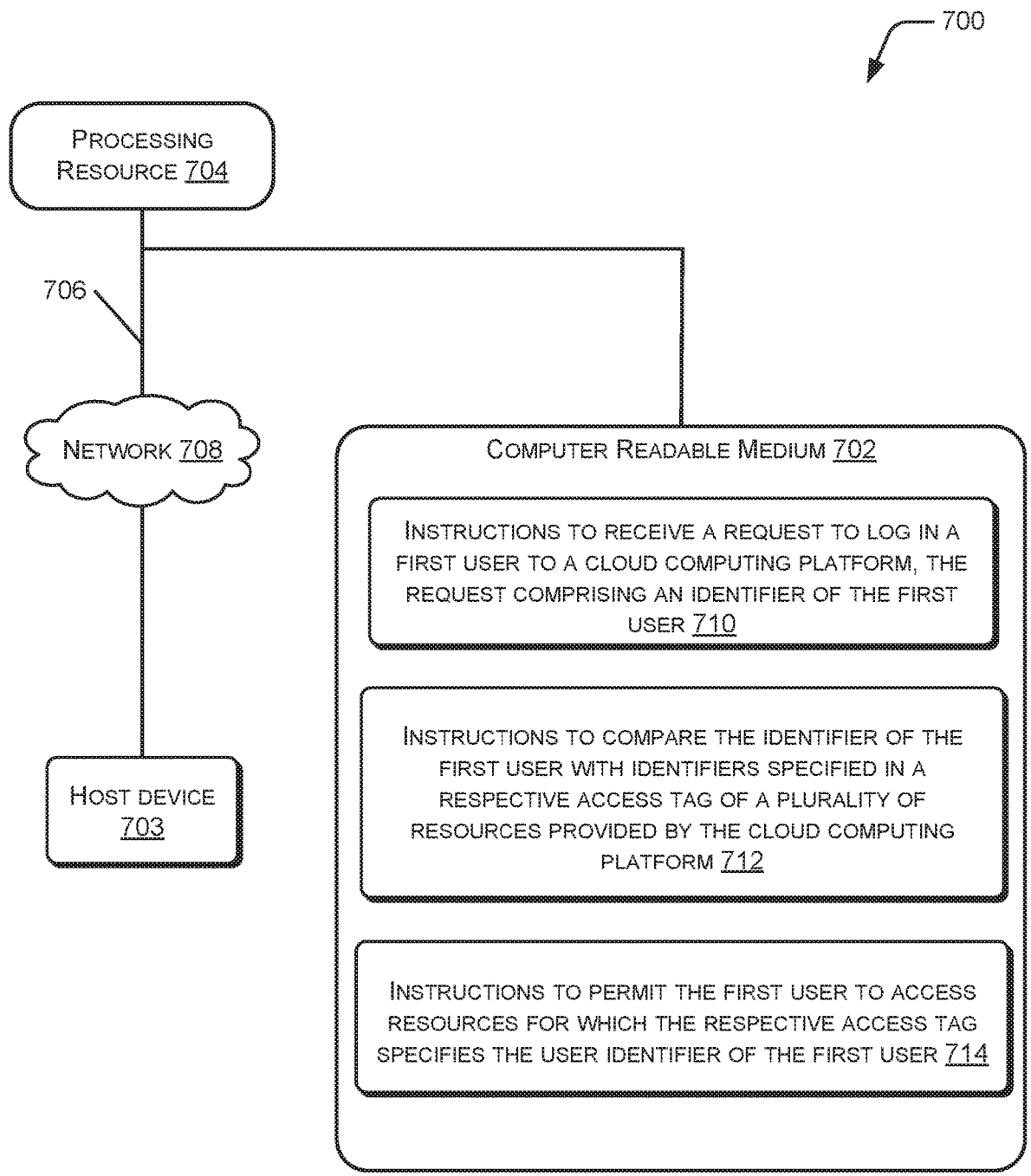
FIG. 7 illustrates a computing environment implementing a non-transitory computer-readable medium for controlling permissions to access cloud computing resources based on tags, according to an example implementation of the present subject matter.

FIG. 7 illustrates a computing environment 700 implementing a non-transitory computer-readable medium 702 for controlling permissions to access cloud computing resources based on tags, according to an example implementation of the present subject matter.

In an example, the non-transitory computer-readable medium 702 may be utilized by a computing system, such as the system 100. In an example, the computing system may be part of a cloud computing platform providing cloud computing resources, such as the first resource 202 and the second resource 220. Further, the computing system may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a system, such as the system 100. The processing resource 704 may be the processor 102. The non-transitory computer-readable medium 702 may be, for example, an internal memory device or an external memory device. In one implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols.

The processing resource 704 and the non-transitory computer-readable medium 702 may also be communicatively coupled to computing devices of the cloud computing platform that host cloud computing resources, such as the host device 703, over the network 708.

In an example implementation, the non-transitory computer-readable medium 702 includes a set of computer-readable instructions to control permissions to access cloud computing resources based on tags. The set of computer-readable instructions can be accessed by the processing resource 704 through the communication link 706 and subsequently executed.

Referring to FIG. 7, in an example, the non-transitory computer-readable medium 702 includes instructions 710 that cause the processing resource 704 to receive a request to log in a user to a cloud computing platform. The request may be the first request 214 and may include an identifier of the user.

The non-transitory computer-readable medium 702 includes instructions 712 that cause the processing resource 704 to compare the identifier of the user with identifiers specified in a respective access tag of a plurality of resources provided by the cloud computing platform. The plurality of resources may include, for example, the first resource 202 and the second resource 220. Accordingly, the respective tags may be the first access tag 204 and the third access tag 218.

The non-transitory computer-readable medium 702 includes instructions 714 that cause the processing resource 704 to permit the user to access resources for which the respective access tag specifies the identifier of the user. In an example, to permit the user to access the resources for which the respective access tag specifies the identifier of the user, a link to the resources may be provided on a user interface (UI) provided to the user.

The plurality of resources may include a first resource, such as the first resource 202, which may be associated with a plurality of access tags. Each access tag may be associated with a respective permission policy indicating a permissible operation on the first resource. In response to receiving the request, a first access tag associated with the first resource may be selected for comparison of the identifier of the user. The first access tag may be selected based on association of the first access tag with a read permission policy, such as the read permission policy 230. If the identifier of the user matches with an identifier specified in the first access tag, a link to the first resource may be provided on a UI provided to the user. The link may be the link 226 and may allow the user to access the first resource.

Subsequently, a notification of selection of the link to the first resource may be received. In response to the notification, the identifier of the user may be compared with identifiers specified in a second access tag of the plurality of access tags. The second access tag may be associated with the write permission policy, which indicates a write operation permissible on the first resource. If the identifier of the user matches with an identifier in the second access tag, the user may be permitted to perform the write operation on the first resource. If the identifier of the user mismatches with each identifier in the second access tag, the user may be prevented from performing the write operation on the first resource. However, the user may be permitted to perform the read operation on the first resource.

In an example, in response to the identifier of the user matching with the identifier specified in the second access tag, the instructions facilitate displaying an option to perform the write operation on a UI corresponding to the first resource, so that the user can perform the write operation on the first resource. If the identifier of the user mismatches with each identifier specified in the second access tag, the instructions cause masking the option to perform the write operation on the UI, thereby preventing the user from performing the write operation on the first resource.

The usage of access tags of the present subject matter provides an efficient manner of controlling access to cloud computing resources. Hence, addition of users to groups, and the creation and management of groups is eliminated. Further, particular users who are to be permitted to access a cloud computing resource may be specified in the access tag. This allows fine-tuning the access permissions for resources. For instance, two resources of the same type (e.g., VM type) may be made accessible to different sets of users by adding different identifiers in their respective access tags. Since comparison of the identifiers with access tags may be performed upon receiving a login request, the user may be provided with links for all permissible resources (i.e., resources the user is permitted to access) once the user logs in. Therefore, the present subject matter provides an efficient technique for navigating to permissible resources.

Still further, generating a user account based on addition of an identifier to an access tag of a resource and granting permission to the user account to access the resource simplifies and automates the generation of user accounts. As a result, separate processes for generating user accounts and granting access rights to the user accounts do not have to be performed.

Although implementations of tag-based access permissions for cloud computing resources have been described in language specific to structural features and/or methods, it is to be understood that the present subject matter is not necessarily limited to the specific features or methods described. Rather, the specific features and methods are disclosed and explained as example implementations.

We claim:

1. A system comprising:
   a processor; and
   a memory coupled to the processor and storing instructions executable by the processor to:
      receive an identifier of a user, wherein the identifier is received as part of one of: a first request to login to a cloud computing platform and a second request to access a first resource provided by the cloud computing platform;
      compare the identifier of the user with one or more identifiers specified in a first access tag associated with the first resource, the one or more identifiers identifying users authorized to access the first resource, and the first access tag being associated with a respective permission policy indicating a permissible operation on the first resource; and
      permit the user to access the first resource to perform the permissible operation based on the comparison of the identifier of the user and the one or more identifiers specified in the first access tag.

2. The system of claim 1, wherein the first resource is associated with a plurality of access tags including the first access tag, each access tag of the plurality of access tags being associated with a respective permission policy indicating a permissible operation on the first resource, and wherein, in response to receiving the second request, the instructions are executable to:
   select the first access tag, from the plurality of access tags, for comparison with the identifier of the user, based on association of the first access tag with a write permission policy indicating a write operation permissible on the first resource; and
   permit the user to access the first resource to perform the write operation on the first resource in response to the identifier of the user matching with an identifier of the one or more identifiers specified in the first access tag.

3. The system of claim 2, wherein, in response to the identifier of the user mismatching with the one or more identifiers specified in the first access tag, the instructions are executable to:
   select a second access tag, from the plurality of access tags, for the comparison with the identifier of the user, based on association of the second access tag with a read permission policy indicating a read operation permissible on the first resource; and
   permit the user to access the first resource to perform the read operation on the first resource in response to the identifier of the user matching with an identifier specified in the second access tag.

4. The system of claim 2, wherein the write permission policy associated with the first access tag is indicative of a set of write operations, and wherein, in response to the identifier of the user matching with the identifier specified in the first access tag, the instructions are executable to:
   permit the user to perform each write operation of the set of write operations on the first resource.

5. The system of claim 1, wherein, in response to receiving the first request, the instructions are executable to:
   compare the identifier of the user with identifiers specified in a respective access tag of a plurality of resources provided by the cloud computing platform, the plurality of resources comprising the first resource; and
   permit the user to access resources of the plurality of resources to perform permissible operations for which the respective access tag specifies the identifier of the user.

6. The system of claim 5, wherein, the instructions are executable to provide a link, on a user interface (UI) provided to the user, to the resources for which the respective access tag specifies the identifier of the user, to permit the user to access the resources to perform the permissible operations.

7. The system of claim 1, wherein the first resource is associated with a plurality of access tags including the first access tag, each access tag of the plurality of access tags being associated with a respective permission policy indicating a permissible operation on the first resource, and wherein, in response to receiving the first request, the instructions are executable to:
   select the first access tag for comparison of the identifier of the user based on association of the first access tag with a read permission policy, the read permission policy indicating a read operation permissible on the first resource; and
   in response to matching of the user identifier with the identifier of the one or more identifiers specified in the first access tag, provide a link to the first resource on a UI provided to the user to permit the user to access the first resource, and wherein the instructions are executable to:
      receive a notification of selection of the link to the first resource;
      compare the identifier of the user with one or more identifiers specified in a second access tag of the plurality of access tags, wherein the second access tag is associated with a write permission policy indicating a write operation permissible on the first resource;

in response to matching of the identifier of the user with an identifier in the second access tag, permit the user to perform the write operation on the first resource; and in response mismatching of the identifier of the user with each identifier in the second access tag:
prevent the user from performing the write operation on the first resource; and
permit the user to perform the read operation on the first resource.

8. The system of claim 7, wherein, in response to the identifier of the user matching with the identifier specified in the second access tag, the instructions are executable to:
provide an option to perform the write operation on a UI corresponding to the first resource, to permit the user to perform the write operation on the first resource, and wherein in response to the identifier of the user mismatching with each identifier specified in the second access tag, the instructions are executable to:
mask the option to perform the write operation on the UI, to prevent the user from performing the write operation on the first resource.

9. The system of claim 1, wherein, prior to receiving one of the first request and the second request from the user, the instructions are executable to:
receive a notification that the identifier of the user is added to the first access tag;
determine whether a user account corresponding to the user is present in the cloud computing platform; and
in response to the determination that a user account corresponding to the user is absent, create the user account corresponding to the user in the cloud computing platform.

10. A method comprising:
receiving, by a processing resource, an identifier of a first user, wherein the identifier is received as part of one of:
a first request to login to a cloud computing platform and a second request to access a first resource provided by the cloud computing platform;
comparing, by the processing resource, the identifier of the first user with a plurality of identifiers specified in a first access tag associated with the first resource, the plurality of identifiers identifying users authorized to access the first resource, and the first access tag being associated with a respective permission policy indicating a permissible operation on the first resource; and
permitting, by the processing resource, the first user to access the first resource to perform the permissible operation in response to matching of the identifier of the first user with one of the plurality of identifiers specified in the first access tag.

11. The method of claim 10, wherein the first resource is associated with a plurality of access tags including the first access tag, each access tag of the plurality of access tags being associated with a respective permission policy indicating a permissible operation on the first resource, and wherein, in response to receiving the second request, the method comprises:
selecting the first access tag, from the plurality of access tags, for comparison with the identifier of the first user, based on association of the first access tag with a write permission policy indicating a write operation permissible on the first resource; and
permitting the first user to access the first resource to perform the write operation on the first resource in response to the identifier of the first user matching with an identifier of the plurality of identifiers specified in the first access tag.

12. The method of claim 11, wherein, in response to the identifier of the first user mismatching with identifiers specified in the first access tag, the method comprises:
selecting a second access tag, from the plurality of access tags, for the comparison with the identifier of the first user, based on association of the second access tag with a read permission policy indicating a read operation permissible on the first resource; and
permitting the first user to access the first resource to perform the read operation on the first resource in response to the identifier of the first user matching with an identifier specified in the second access tag.

13. The method of claim 10, wherein, in response to receiving the first request, the method comprises:
comparing the identifier of the first user with identifiers specified in a respective access tag of a plurality of resources provided by the cloud computing platform, the plurality of resources comprising the first resource; and
permitting the first user to access resources of the plurality of resources to perform permissible operations for which the respective access tag specifies the identifier of the first user.

14. The method of claim 10, wherein the first resource is associated with a plurality of access tags including the first access tag, each access tag of the plurality of access tags being associated with a respective permission policy indicating a permissible operation on the first resource, and wherein, in response to receiving the first request, the method comprises:
selecting the first access tag for comparison of the identifier of the first user based on association of the first access tag with a read permission policy, the read permission policy indicating a read operation permissible on the first resource; and
in response to matching of the identifier of the first user with the identifier of the plurality of identifiers specified in the first access tag, providing a link to the first resource on a UI provided to the first user to permit the first user to access the first resource, and wherein the method further comprises:
receiving a notification of selection of the link to the first resource;
comparing the identifier of the first user with one or more identifiers specified in a second access tag of the plurality of access tags, wherein the second access tag is associated with a write permission policy indicating a write operation permissible on the first resource;
in response to matching of the identifier of the first user with an identifier in the second access tag, permitting the first user to perform the write operation on the first resource; and
in response mismatching of the identifier of the first user with each identifier in the second access tag:
preventing the first user from performing the write operation on the first resource; and
permitting the first user to perform the read operation on the first resource.

15. The method of claim 10, comprising:
receiving a third request from the first user to access the first access tag; and
permitting the first user to access an editable version of the first access tag in response to a determination that the first user has permission to edit access tag, to allow the first user to add an identifier of a second user to the first access tag.

16. The method of claim 10, wherein the first resource is one of a virtual machine (VM) type, a cloud storage resource type, an application type, and a database instance type.

17. A non-transitory computer-readable medium comprising instructions, the instructions being executable by a processing resource to:
receive a request to log in a user to a cloud computing platform, the request comprising an identifier of the user;
compare the identifier of the user with identifiers specified in a respective access tag of a plurality of resources provided by the cloud computing platform, the identifiers identifying users authorized to access the plurality of resources, and the respective access tag being associated with a respective permission policy indicating a permissible operation on the plurality of resources; and
permit the user to access resources for which the respective access tag specifies the identifier of the user to perform the permissible operation.

18. The non-transitory computer-readable medium of claim 17, wherein the instructions are executable to provide a link, on a user interface (UI) provided to the user, to the resources for which the respective access tag specifies the identifier of the user, to permit the user to access the resources to perform the permissible operation.

19. The non-transitory computer-readable medium of claim 17, wherein the plurality of resources comprises a first resource, wherein the first resource is associated with a plurality of access tags, each access tag being associated with a respective permission policy indicating a permissible operation on the first resource, and wherein, in response to receiving the request, the instructions are executable to:
select a first access tag of the plurality of access tags for comparison of the identifier of the user based on association of the first access tag with a read permission policy, the read permission policy indicating a read operation permissible on the first resource; and
in response to matching of the user identifier with an identifier specified in the first access tag, provide a link to the first resource on a UI provided to the user to permit the user to access the first resource, and wherein the instructions are executable to:
receive a notification of selection of the link to the first resource;
compare the identifier of the user with identifiers specified in a second access tag of the plurality of access tags, wherein the second access tag is associated with a write permission policy indicating a write operation permissible on the first resource;
in response to matching of the identifier of the user with an identifier in the second access tag, permit the user to perform the write operation on the first resource; and
in response mismatching of the identifier of the user with each identifier in the second access tag:
prevent the user from performing the write operation on the first resource; and
permit the user to perform the read operation on the first resource.

20. The non-transitory computer-readable medium of claim 19, wherein, in response to the identifier of the user matching with the identifier specified in the second access tag, the instructions are executable to:
display an option to perform the write operation on a UI corresponding to the first resource, to permit the user to perform the write operation on the first resource, and wherein in response to the identifier of the user mismatching with each identifier specified in the second access tag, the instructions are executable to:
mask the option to perform the write operation on the UI, to prevent the user from performing the write operation on the first resource.

* * * * *